United States Patent
Kim et al.

(10) Patent No.: US 10,044,384 B2
(45) Date of Patent: Aug. 7, 2018

(54) DATA TRANSMISSION TERMINAL, DATA TRANSMISSION/RECEPTION SYSTEM AND DATA TRANSMISSION METHOD

(71) Applicant: SK PLANET CO., LTD., Seongnam-si, Gyeonggi-do (KR)

(72) Inventors: Jong Il Kim, Seoul (KR); Ki Cheol Kim, Seoul (KR)

(73) Assignee: SK PLANET CO., LTD., Seongnam-Si (KR)

(*) Notice: Subject to any disclaimer, the term of this patent is extended or adjusted under 35 U.S.C. 154(b) by 0 days.

(21) Appl. No.: 15/637,897

(22) Filed: Jun. 29, 2017

(65) Prior Publication Data

US 2017/0302309 A1     Oct. 19, 2017

Related U.S. Application Data

(63) Continuation of application No. 14/952,480, filed on Nov. 25, 2015, now Pat. No. 9,729,176.

(30) Foreign Application Priority Data

Dec. 2, 2014 (KR) ........................ 10-2014-0170687

(51) Int. Cl.
*H04B 1/04* (2006.01)
*H04B 11/00* (2006.01)

(52) U.S. Cl.
CPC ........... *H04B 1/0475* (2013.01); *H04B 11/00* (2013.01)

(58) Field of Classification Search
CPC .... H04B 1/0475; H04B 11/00; H04L 27/0006
See application file for complete search history.

(56) References Cited

U.S. PATENT DOCUMENTS

2014/0369169 A1* 12/2014 Iida ........................ H04B 11/00
367/135

* cited by examiner

*Primary Examiner* — Jaison Joseph
(74) *Attorney, Agent, or Firm* — Brinks Gilson & Lione

(57) ABSTRACT

A data transmission terminal according to the present invention comprises: a communication unit which performs communication with a server; a noise collection unit which collects a peripheral noise; a data transmission unit which transmits data to a data reception terminal through an audible frequency band; and a control unit which analyzes the collected noise to generate a noise analysis result and controls the communication unit to transmit the noise analysis result to the server.

12 Claims, 7 Drawing Sheets

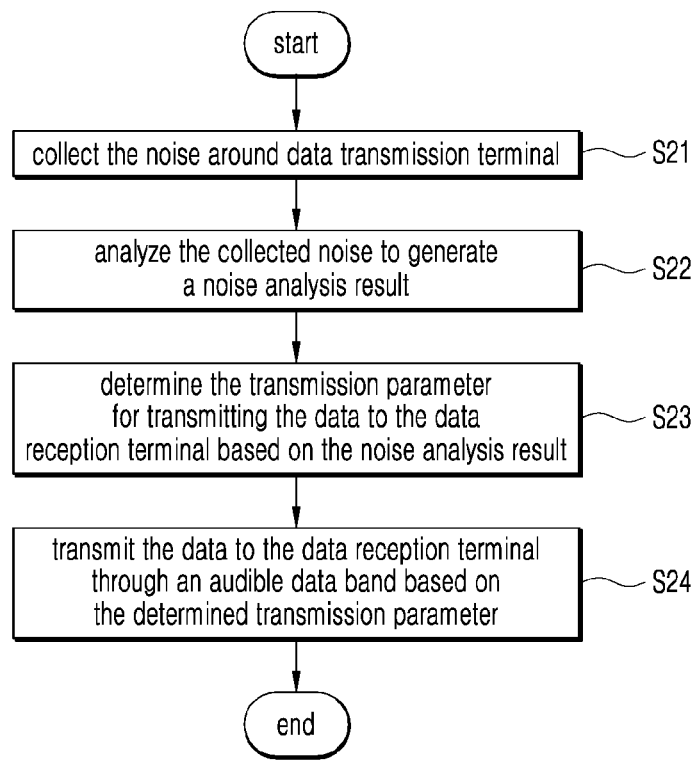

DATA TRANSMISSION TERMINAL, DATA TRANSMISSION/RECEPTION SYSTEM AND DATA TRANSMISSION METHOD

CROSS-REFERENCE TO RELATED APPLICATIONS

The instant application is a continuation of U.S. patent application Ser. No. 14/952,480 filed Nov. 25, 2015, which is based on and claims priority to Korean Patent Applications No. 10-2014-0170687, filed on Dec. 2, 2014 in the Korean Intellectual Property Office. The disclosures of above-listed applications are hereby incorporated by reference herein in their entirety.

TECHNICAL FIELD

The present invention relates to a data transmission terminal which transmits (or sends) through an audible frequency (or an audible frequency band), a data reception terminal which receives the data through the audible frequency, a data transmission/reception system comprising the data transmission terminal and the data reception terminal, and a data transmission method.

BACKGROUND ART

FIG. 1 is an illustration showing a general data transmission/reception system. When referring to FIG. 1, the general data transmission/reception system can comprise a data transmission terminal SENDER and a data reception terminal RECEIVER.

The data transmission terminal generally transmits data by modulating a digital signal using frequencies. Here, a signal modulation technique can include an amplitude shift keying (ASK), a phase shift keying (PSK), and a frequency shift keying (FSK).

Recently, a technique which transmits (or sends) data through an audible frequency for humans (an audible frequency band) has been introduced. The audible frequency band of human is a range of 20 Hz-20 KHz, and for voices, ranges of 85-180 Hz and 165-255 Hz bands are mainly used for men and women, respectively. As for currently available terminals, they have speakers and microphones which are designed to support all the audible frequency band in order to transmit and receive human voices.

When data transmission/reception is performed by using an audible frequency which is not easily recognized by humans, it is beneficial because the data transmission/reception using terminals can be realized without requiring a separate hardware device. Also, when an audible high frequency is used, no pairing process is required between devices, which results in an easy data delivery.

However, according to the conventional data transmission method using an audible high frequency, a transmitted data is represented by combining predetermined frequencies, and it does not perform any process on noises or interferences which are collected in the data transmission environment, which causes a recognition rate to fall since it is hard to discriminate a signal from the noise when an interference exists in the preset frequency band.

Meanwhile, the description set forth as the background of the invention in the above is merely provided to ease the understanding on the background of the invention, and it can no way be regarded as an admission as the prior art which is already known to a person with ordinary skill in the art.

DETAILED DESCRIPTION OF THE INVENTION

Technical Problem

An objective of the present invention is to provide a data transmission terminal, which improves a data recognition rate (or a restoration rate) by collecting a peripheral noise (or an environmental noise) around a data transmission terminal which transmits data through an audible frequency band, analyzing the environmental noise to actively detect an interference-free audible frequency band, and transmitting the data through the detected audible frequency band, a data reception terminal, a data transmission/reception system comprising the data transmission terminal and the data reception terminal, and a data transmission method.

Technical Solution

The objective can be accomplished by a data transmission terminal comprising: a communication unit which performs communication with a server; a noise collection unit which collects a peripheral noise; a data transmission unit which transmits data to a data reception terminal through an audible frequency band; and a control unit which analyzes the collected noise to generate a noise analysis result and controls the communication unit to transmit the noise analysis result to the server, wherein the server is characterized in that it determines a transmission parameter for transmitting the data based on the noise analysis result, and the control unit is characterized in that it controls the data transmission unit to transmit the data based on the determined transmission parameter.

Also, the objective can be accomplished by a data transmission terminal comprising: a noise collection unit which collects a peripheral noise; a data transmission unit which transmits data to a data reception terminal through an audible frequency band; and a control unit which analyzes the collected noise to generate a noise analysis result, determines a transmission parameter for transmitting the data based on the noise analysis result, and controls the data transmission unit to transmit the data based on the determined transmission parameter, wherein the data reception terminal is characterized in that it acquires the data based on the transmission parameter.

Also, the objective can be accomplished by a data transmission method which is performed by a data transmission terminal and characterized in comprising: collecting a peripheral noise; analyzing the collected noise to generate a noise analysis result; determining the transmission parameter for transmitting the data to a data reception terminal based on the noise analysis result; and transmitting the data to the data reception terminal through the audible frequency band based on the determined transmission parameter.

Advantageous Effects

By adopting the data transmission terminal, the data reception terminal, the data transmission/reception system comprising the data transmission terminal and the data reception terminal, and the data transmission method according to an embodiment of the present invention, the data recognition rate (or a restoration rate) can be improved by collecting a peripheral noise (or an environmental noise) around the data transmission terminal which transmits data through an audible frequency band, analyzing the environmental noise to actively detect an interference-free audible frequency band, and transmitting the data through the detected audible frequency band.

DESCRIPTION OF THE DRAWINGS

FIG. 7 is a flow chart showing a data transmission method according to another embodiment of the present invention disclosed in the instant application.

MODE OF THE INVENTION

Figure 1:
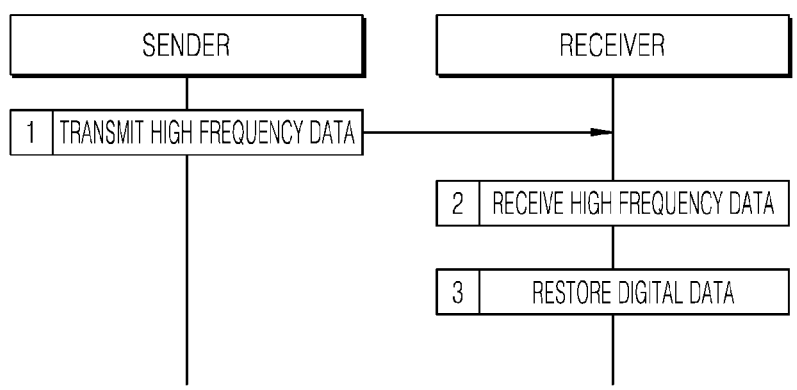
FIG. 1 is an illustration showing a general data transmission/reception system.

Technical terms used herein are used merely for illustrating specific embodiments, and it is to be noted that they are not intended to limit technical spirit disclosed in this specification. Also, the technical terms used herein are to be construed by the meanings normally accepted by the person having ordinary skill in the relevant art, unless specifically defined by other meanings in this specification, and it is neither to be construed by excessively comprehensive meanings nor excessively narrow meanings. Also, when the technical terms used herein are determined to be wrong technical terms which fail to represent the technical spirit disclosed in this specification correctly, the terms are to be replaced by the technical terms which can be accurately understood by the person having ordinary skill in the art.

Also, the general terms used in this specification are to be construed as defined in the dictionaries or according to context, and they are not to be construed in an excessively narrow meaning.

Also, the singular representation used in this specification includes plural representations unless it is clearly expressed in the context to the contrary. The terms "include" or "is composed of" in this specification are not to be construed to necessarily include all components and all steps cited in this specification, and it should be construed to exclude some components or some steps or further include additional components and steps.

Also, the terms representing an ordinal number such as first, second, etc. used in this specification can be used to explain various components, however, the components are not to be limited by these terms. These terms are used only for discriminate one component from other components. For example, the first component can be entitled as a second component, and similarly, the second component can be entitled as the first component, without departing from the technical scope of the present invention.

In the following, embodiments disclosed in this specification are to be described in detail by referring to the appended figures, wherein the same reference numerals are given to the same or like components irrespective of the number of the figures, and duplicate description on them will be omitted.

Also, when it is determined that a detailed description on a relevant known art will obscure the subject matter disclosed in the specification while describing the technologies disclosed in this specification, the detailed description will be omitted.

Also, it is to be noted that the appended figures are only for facilitating the technical spirit disclosed in this specification and the technical spirit are not to be construed to be limited by the appended figures.

Figure 2:
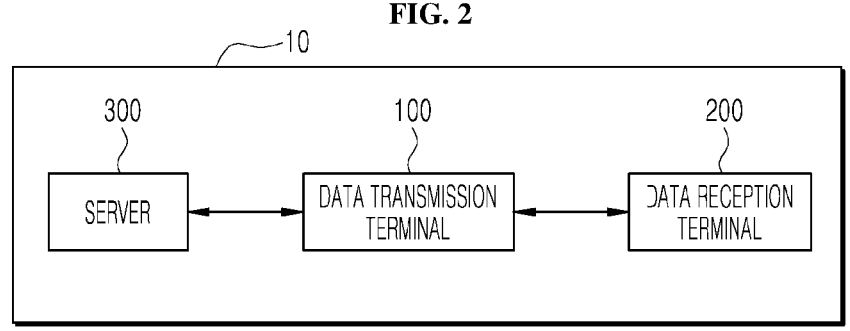
FIG. 2 is a schematic configuration of a data transmission/reception system according to an embodiment of the present invention.

FIG. 2 is a schematic configuration of a data transmission/reception system according to an embodiment of the present invention.

When referring to FIG. 2, the data transmission/reception system 10 according to an embodiment disclosed in the instant application can comprise a data transmission terminal 100, a data reception terminal 200, and a server 300. In addition to this, the data transmission/reception system can further comprise various components for performing data transmission/reception functions according to an embodiment disclosed in the instant application.

The data transmission terminal 100 can serve to transmit (or send) data to the data reception terminal 200 through an audible frequency band. In order to accomplish this, the data transmission terminal 100 can modulate the data for the audible frequency band. That is, the data transmission terminal 100 comes to transmit the data by modulating a digital signal using an audible frequency.

Here, a signal modulation technique can include an amplitude shift keying (ASK), a phase shift keying (PSK), and a frequency shift keying (FSK). It will be apparent to a person having ordinary skill in the art that various other signal modulation techniques can be applied to the invention disclosed in the instant application.

Also, the audible frequency band can be a frequency band which is included in a range of 20 Hz-20 KHz, that is, an audible frequency for humans. In particular, the audible frequency band can be the one which corresponds to a high frequency band included in the audible frequency band for humans. For example, the audible frequency band can be a frequency band which is equal to or higher than 17 kHz.

The data transmission terminal 100 according to the present invention can collect a noise (or a racket) around the data transmission terminal 100. Also, data transmission terminal 100 can analyze the collected noise to generate a noise analysis result.

The noise analysis result can include information on a noise pattern for the collected noise. The information on the noise pattern can include information which is related to at least one of a frequency band of the noise, a generation period of the noise, and a generation time of the noise.

The data transmission terminal 100 can transmit the generated noise analysis result to the server 300. In order to accomplish this, the data transmission terminal 100 can perform communication with the server 300 through a network, and the data transmission terminal 100 can support various communication methods and communication protocols in order to communicate with the server. For example, the data transmission terminal 100 can perform communication with the server 300 through at least one of among a mobile communication network, a transfer control protocol/Internet protocol (TCP/IP), a local area network (LAN), a Wireless LAN, a Wi-Fi, a wireless broadband (Wibro), and a world interoperability for microwave access (Wimax).

The server 300 can determine a transmission parameter for transmitting the data based on the noise analysis result. Also, the data transmission terminal 100 can transmit the data based on the determined transmission parameter.

According to one embodiment of the present invention, the transmission parameter includes at least one of the audible frequency band which is to be used for the transmission of data, and a data transmission period. For example, when the collected noise patterns are "frequency: 16 kHz" and "noise generation period: 3.1 ms", the server 300 can determine the transmission parameter such that the data transmission terminal 100 transmits the data using a transmission audible frequency (or audible frequency band) of 18 kHz and a data transmission period of 2.1 ms in order to minimize a decrease in the data recognition rate due to the noise patterns during the data transmission through the audible frequency band.

Also, the data transmission terminal 100 can transmit the generated transmission parameter to the data reception terminal 200. In this case, the data reception terminal 200 can acquire the data which is transmitted from the data transmission terminal 100 based on the transmission parameter.

That is, data reception terminal 200 can restore the data, which has been modulated by the audible frequency band, based on the transmission parameter, and can restore the modulated data based on a demodulation method corresponding to the aforementioned modulation method. In order to accomplish this, the data reception terminal 200 comes to receive the transmission parameter, which includes the audible frequency band and the transmission period used for transmission, from the data transmission terminal 100.

According to an embodiment of the present invention, the data transmission terminal 100 can transmit the data to the data reception terminal during a transmission phase and can transmit the transmission parameter to the data reception terminal during a resting phase. Here, the transmission phase and resting phase can be the ones which are periodically repeated.

Also, the data transmission terminal 100 can transmit the transmission parameter to the data reception terminal 200 through each of a plurality of predetermined temporary audible frequency bands. In this case, data reception terminal 200 can acquire the transmission parameter through one temporary audible frequency band of the plurality of temporary audible frequency bands.

Figure 3:
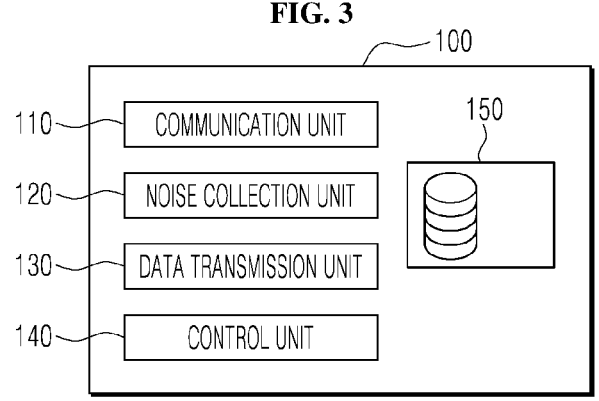
FIG. 3 is a schematic configuration showing the configuration of a data transmission terminal according to an embodiment disclosed in the instant application.

FIG. 3 is a schematic configuration showing the configuration of a data transmission terminal according to an embodiment disclosed in the instant application.

When referring to FIG. 3, the data transmission terminal 100 according to an embodiment disclosed in the instant application can comprise a communication unit 110, a noise collection unit 120, a data transmission unit 130, a control unit 140, and a storage unit 150.

Here, an overall configuration or a part of the data transmission terminal 100, which includes the communication unit 110, the noise collection unit 120, the data transmission unit 130, and a control unit 140, can be embodied as a hardware module or a software module, or can be embodied as a combination thereof. In addition to this, the data transmission terminal 100 can further comprise various components for performing data transmission functions according to an embodiment disclosed in the instant application.

In the following, a detailed configuration of the data transmission terminal 100 will be explained; the content duplicate to the content related to the data transmission terminal included in the data transmission/reception system disclosed in FIG. 2 can be omitted, and the description as follows will focus on a functional aspect of the shown hardware components.

The communication unit 110 can serve to perform communication with an external device, and the external device can be the server 300 which was explained in the above.

The communication unit 110 can communicate with the external device by using various communication methods or communication protocols. For example, the communication unit 110 can communicate with the external device by using at least one of communication method or communication protocol among a mobile communication network, a transfer control protocol/Internet protocol (TCP/IP) Transmission control protocol/Internet protocol, a local area network (LAN), a Wireless LAN, a Wi-Fi, a wireless broadband (Wibro), and a world interoperability for microwave access (Wimax).

The communication unit 110 can serve to transmit a noise analysis result for the noise collected at the noise collection unit 120 to the server 300, and to receive a transmission parameter which was determined based on the noise analysis result. Here, the noise analysis result can include information which is related to at least one of a frequency band of the noise, a generation period of the noise, and a generation time of the noise.

Also, the transmission parameter includes at least one of the audible frequency band which is to be used for the transmission of data, and a data transmission period.

The noise collection unit 120 can serve to collect a noise around the data transmission terminal 100. In order to accomplish this, the noise collection unit 120 can be implemented by including at least one of an antenna, an analog front end (AFE), a radio frequency (RF) stage, and a sensor.

The data transmission unit 130 can serve to transmit the data through the audible frequency band to the data reception terminal 200. For data transmission, the data transmission unit 130 can be implemented by including at least one of an antenna, an analog front end (AFE), a radio frequency (RF) stage, and a sensor.

According to an embodiment, the server 300 can receive the noise analysis result from the communication unit 110 and then determine the transmission parameter for transmitting the data based on the noise analysis result. In this case, the control unit 140 can control the data transmission unit 130 to transmit the data based on the determined transmission parameter.

According to another embodiment, the data transmission terminal 100 can determine the transmission parameter on its own based on the noise analysis result without the aid by the server 300. In this case, the control unit 140 can generate the noise analysis result by analyzing the collected noise, determine the transmission parameter for transmitting the data based on the noise analysis result, and control the data transmission unit to transmit the data based on the determined transmission parameter.

Also, the data reception terminal 200 can acquire (or restore or recognize) the data based on the transmission parameter.

The storage unit 150 can serve to store the information which is inputted, received, or processed by the data transmission terminal 100. For example, the storage unit 150 can store the information on the transmission parameter, which is inputted via the communication unit 110, and the noise analysis result.

The storage unit 150 can be configured to include at least one type of storage medium, such as a flash memory type storage medium, a hard disk type storage medium, a solid state disk (SSD) or a solid state drive (SSD), a multimedia card micro type storage medium, a card memory type storage medium such as a secure disk (SD) or an extended disk (XD) memory, etc., a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

In the following, the data transmission function or method according to an embodiment of the present invention will be explained by referring to FIGS. 4 and 5.

Figure 4:
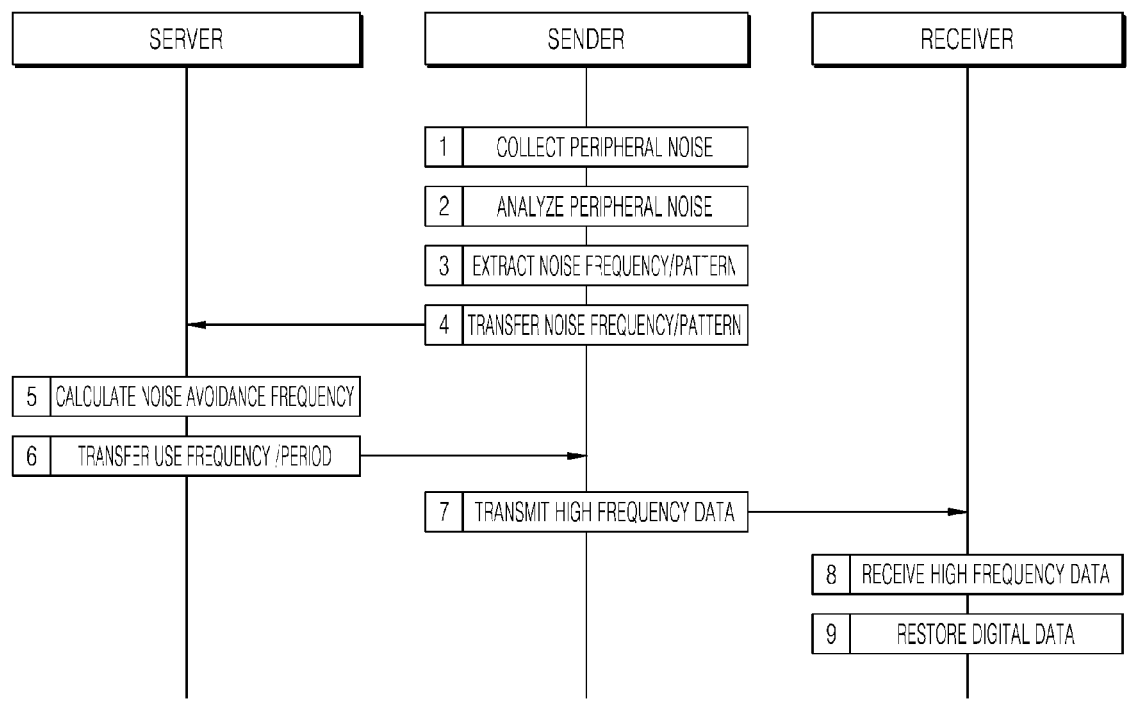
FIGS. 4 and 5 are illustrations showing a data transmission method according to a specified embodiment of the present invention disclosed in the instant application.
Figure 5:
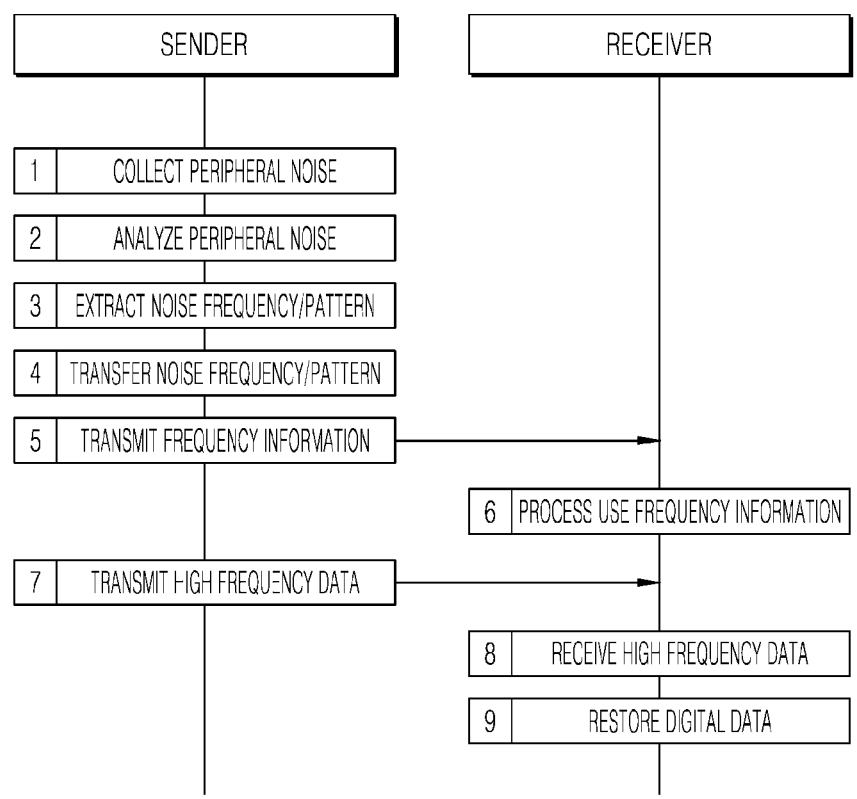

FIGS. 4 and 5 are illustrations showing a data transmission method according to an embodiment of the present invention. Here, FIG. 4 shows a case in which the determination of the transmission parameter is performed by the server (SERVER) 300, and FIG. 5 shows a case in which the determination of the transmission parameter is performed by the data transmission terminal SENDER 100.

Generally, a device which generates or plays sound is called a data transmission terminal SENDER, and a device which recognizes and processes the sound is called a data reception terminal RECEIVER. All devices such as a mobile device, a point on sales (POS), a personal computer (PC), etc., where a microphone or a speaker can be implemented or connected, can be used as the SENDER and the RECEIVER.

When referring to FIG. 4, at first, the data transmission terminal SENDER can collect a racket or a noise around the data transmission terminal SENDER (1. COLLECT PERIPHERAL NOISE).

Then, the data transmission terminal SENDER can analyze the collected noise and extract a noise pattern such as a noise frequency and a noise generation period, etc. as a noise analysis result for the noise (2. ANALYZE PERIPHERAL NOISE and 3. EXTRACT NOISE FREQUENCY/PATTERN).

Then, the data transmission terminal SENDER can transfer (send or transmit) the noise analysis result to the server (4. TRANSFER NOISE FREQUENCY/PATTERN).

The server can calculate (detect or computer) a noise avoidance frequency, which improves a data recognition rate, based on the received noise analysis result (5. CALCULATE NOISE AVOIDANCE FREQUENCY).

Then, the server can transfer a use frequency and a transmission period (corresponding to the aforementioned transmission parameter), which can be used for transmitting data, to the data transmission terminal through the calculated noise avoidance frequency (6. TRANSFER USE FREQUENCY/PERIOD).

The data transmission terminal SENDER comes to perform the data transmission through a high frequency audible frequency band by using the received use frequency or transmission period (7. TRANSMIT HIGH FREQUENCY DATA).

The data reception terminal Receiver comes to receive the data which has been transmitted through the high frequency audible frequency band (8. RECEIVE HIGH FREQUENCY DATA).

Then, the, data reception terminal Receiver restores the received data based on the information on the use frequency or the transmission period (9. RESTORE DIGITAL DATA). In order to accomplish this, the data reception terminal can receive or acquire the information on the use frequency or the transmission period from the data transmission terminal.

When referring to FIG. 5, the data transmission terminal can determine the use frequency and the transmission period on its own without the aid of the server based on the noise analysis result.

That is, as shown in FIG. 5, the data transmission terminal can extract the noise frequency and a noise pattern, determine an available audible frequency by which the noise frequency is avoided, and transfer the information on the available audible frequency to the data reception terminal such that the digital data can be restored (Refer to 1-9 in FIG. 5 for more details).

Figure 6:
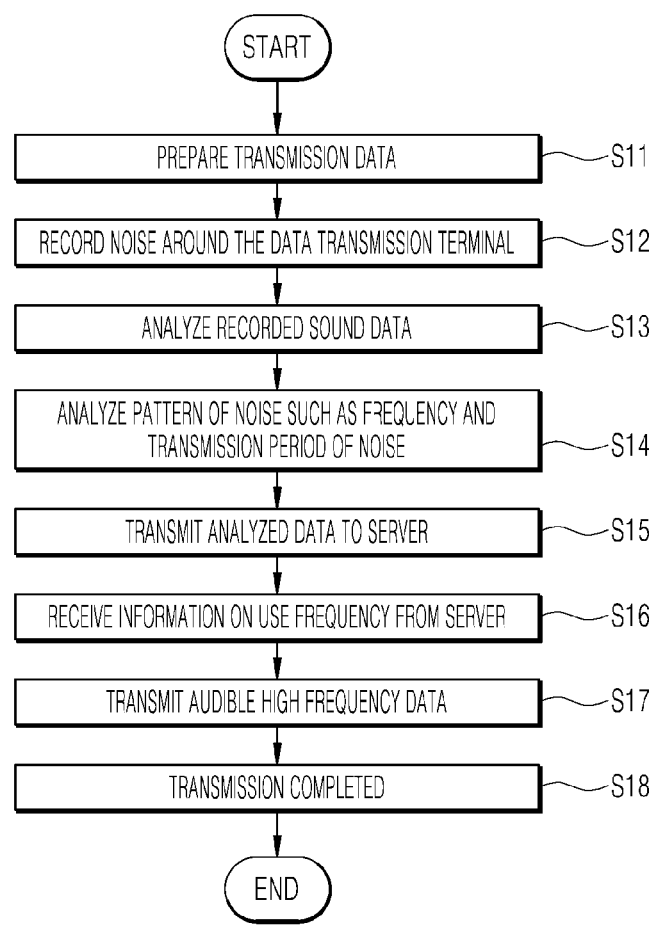
FIG. 6 is a flow chart showing a data transmission method according to an embodiment of the present invention disclosed in the instant application.

FIG. 6 is a flow chart showing a data transmission method according to an embodiment of the present invention disclosed in the instant application. FIG. 6 illustrates an embodiment in which the transmission parameter is determined by the server.

At first, the data transmission terminal can prepare the data to be transmitted (S11). Next, the data transmission terminal can record (or collect) the noise around the data transmission terminal (or a transmitting device) (S12).

Then, the data transmission terminal can proceed to analyze the data on the recorded or collected sound (S13). In the meantime, the data transmission terminal can analyze the noise pattern of the noise such as a frequency or a transmission period of the noise (S14).

Next, the data transmission terminal can transmit a noise analysis result which is an analysis result (analyzed data) on the noise to the server (S15).

In this case, the server can define a use frequency which yields a good recognition rate based on the noise analysis result.

The data transmission terminal can receive the information on the defined use frequency from the server (S16).

Then, the data transmission terminal can transmit audible frequency data to the data reception terminal through an audible frequency which corresponds to the use frequency (S17). In this case, the data reception terminal comes to acquire the information on the use frequency from the data transmission terminal and restores the information.

FIG. 7 is a flow chart showing a data transmission method according to another embodiment of the present invention disclosed in the instant application.

At first, the data transmission terminal can receive the noise around the data transmission terminal (S21).

Next, the data transmission terminal can analyze the collected noise to generate a noise analysis result (S22).

Then, the data transmission terminal can determine the transmission parameter for transmitting the data to the data reception terminal based on the noise analysis result (S23).

Next, the data transmission terminal can transmit the data to the data reception terminal through an audible data band based on the determined transmission parameter (S24).

Here, the noise analysis result can include information which is related to at least one of a frequency band of the noise, a generation period of the noise, and a generation time of the noise. Also, the transmission parameter includes at least one of the audible frequency band which is to be used for the transmission of data, and a data transmission period.

The technology disclosed in the instant application can be summarized as follows. A POS at a member store or a place of business can recognize a visit of a user by using an audible high frequency, and the desired information can be transferred to the recognized user. On the other hand, there can be various noises around various kinds of business such as restaurant business, book stores, etc. The noise/racket, which normally occurs, mainly consists of audible frequency bands; however, in an environment where metal substances collide frequently, a high frequency racket can often occur.

In this case, a data transmission and reception rate can be greatly affected when the frequency band of the noise is overlapped with a frequency used for transmitting the audible high frequency data. For example, when it is specified that an audible frequency of 17.5 KHz is to be used for transmitting data, it will be very difficult to tell whether the data at the frequency is data or a noise when the noise frequently occurs at the frequency of 17.5 KHz.

In order to solve this problem, the same data can be periodically according to the prior art. However, when the same noise is continuously and periodically generated, it will be very hard to avoid this noise.

In order to overcome the problem as above, according to the present invention, an analysis process on the peripheral noise can be performed before transmitting the data through the audible high frequency band. The result obtained by the analysis process of the noise can include frequency bands, periods, lengths, etc. of major noises. The analysis process on the noise can be performed in a device for transmitting the audible high frequency, or, it can be still possible that the device only collects a sound source and delivers the collected sound source to the server, while the server actually performs the analysis process.

The information, which is collected as above, can be transferred to and stored in the server.

The device, which transmits and receives the audible high frequency data, can receive the frequency band and the data period required for transmitting the data from the server, and process audible high frequency data dynamically based on the data. In a situation where the server cannot be accessed, the device which transmits and receives the audible high frequency can directly transfer the data. A transmission/reception device can predefine a frequency for which existence of data can be discriminated, and then perform the analysis on the data based on whether the corresponding data exists. A duration in which the data is actually transmitted is defined as a transmission phase while a duration in which the data is not transmitted is defined as a resting phase, and the transmission phase and the resting phase can be repeated while the data is transmitted.

Generally speaking, meaningless data tends to be transmitted during the resting phase according to the prior art, while according to present invention, the frequency information used for transmitting data at an audible high frequency is delivered, such that a receiving device (data reception terminal) can detect the frequency used for analyzing the high frequency data by referring to the resting phase. Also, it is also possible that, rather than using the resting phase, the data on the frequency used for transmitting data is transmitted through all frequency bands used by the technology disclosed in the instant application before the audible high frequency data is sent, such that the receiving data can process the data.

The POS which was explained in the above can be replaced by a PC or a mobile device at a place of business. Also, the technology disclosed in the instant application can be applied to the case in which the audible high frequency data is transmitted between mobile devices, rather than a stationary PC such as POS, etc., thereby improving the recognition rate.

Therefore, the drawback of a conventional solution for which the recognition rate is degraded due to a noise or a racket, etc., which is introduced during a transmission process of data, can be corrected by adopting the present invention.

Also, the noise data, etc. can be arranged in a database and noise patterns for business types and places can be stored as a big data format, such that specialized services can be provided for various business types and places. For example, when a noise, which frequently occurs at specific places, is detected, an additional device for minimizing or removing the noise can be arranged in the member stores. Also, for example, when a noise, which occurs in a specific business type, is detected, a transmission parameter (or the noise pattern) for the detected noise is delivered to other member stores of a similar business type, such that the transmission parameter can be applied to a data transmission/reception process through the audible frequency band for the other member stores.

Meanwhile, the realized articles of functional operations and subject matters described in this specification can be implemented using digital electronic circuits, or implemented as computer software, firmware, or hardware including the configuration disclosed in this specification and structural equivalents thereof, or as a combination be at least one of these implementations. The articles of realization of the subject matter described in this specification can be implemented as one or more computer program product, that is, one or more module related to computer program instructions which are encoded on a tangible program storage medium for controlling the operation of the process system or for being executed by the same.

The computer-readable medium can be a machine-readable storage device, a machine-readable storage board, a memory device, a composition of materials affecting machine-readable wave signals, and a combination of at least one of them.

The term such as "a system" or "a device" in this specification encompasses all tools, devices, and machines for processing data including, for example, a programmable processor, a computer, or a multi-processor. The process system can include a code for creating an execution atmosphere for the computer program, when requested by a code constituting a processor firmware, a protocol stack, a database management system, an operating system, or a combination of at least one of them, etc., in addition to a hardware.

The computer (also known as a program, a software, a software application, a script, or a code) can be created in all types of program languages including a compiled or interpreted language or a priori or procedural language, and can be arranged in all types including standalone programs, modules, subroutines, and other units proper to be used in a computing environment. The computer program does not necessarily correspond to a file of a file system. The program can be stored in a single file provided by the requested program, in multiple files which interact with each other (for example, files storing one or more module, low level programs or some of the code), or in a part of the file containing other programs or data (for example, one or more script stored in a markup language document). The computer program can be arranged to be positioned in one site or distributed over a plurality of sites, such that it can be executed on multiple computers interconnected via a communication network or on a single computer.

Meanwhile, the computer-readable medium which is proper for storing computer program instructions and data can include and all types of nonvolatile memories, media, and memory devices including a semiconductor memory device such as EPROM, EEPROM and flash memory device, a magnetic disk such as internal hard disk or removable disk, optical disk, a CD-ROM and a DVD-ROM disk. The processor and the memory can be supplemented by a special purpose logic circuit or integrated into the same.

The article of realization of the subject matter described in this specification can include a back-end component such as a data server, a middleware component such as an application server, or a front-end component such as a client computer having a web browser or a graphic user interface which enables a user to interact with the article of realization of the subject matter described in this specification, or can implement all combinations of these back-end, middleware, or front-end components in a computing system. The components of a system can be interconnected with each other by all types or media of digital data communication such as a communication network.

Although this specification includes details of various specific implementations, it is not to be understood as limiting for all inventions or scope to be claimed, and it should rather be understood as an explanation for the features which can be unique to specific implementations of the specific invention. Similarly, the specific features described in this specification in the context of separate implementations can be implemented to be combined in a single implementation. On the contrary, various features described in the context of the single implementation can also be implemented as discrete or proper low level combinations as well as in various implementations. Furthermore, although the features can be depicted as work in a specific combination and as claimed in the first place, one or more features from the claimed combination can be excluded from the combination in some cases, and the claimed combination can be changed to the low level combinations or sub combinations.

Also, although this specification depicts the operations in a specific order in the drawings, it is not to be understood that this specific sequence or order should be maintained or all the shown operations should be performed in order to obtain the preferred results In specific cases, multitasking and parallel processing can be preferable. Also, the division of various system components of the aforementioned embodiments are not to be construed as being required by all embodiments, and it is to be understood that the described program components and systems can generally be unified into a single software product or packaged in multiple software products.

Similarly, this specification is not intended to limit the present invention to specific terms provided. Therefore, although the present invention has been explained in detail by referring to the aforementioned examples, it is possible for the person having ordinary skill in the art to alter, change, or modify these examples without departing from the scope of the present invention. The scope of the present invention is expressed by the claims, not by the specification, and all changes and modified shapes derived from the meanings of the claims, scopes, and the equivalents thereof are construed to be included in the scope of the present invention.

The invention claimed is:

1. A data reception terminal comprising:
   a data reception unit which receives data transmitted from a data transmission terminal based on a transmission parameter through an audible frequency band; and
   an acquisition unit which acquires the data based on the transmission parameter,
   wherein the transmission parameter is determined based on a noise analysis result for a noise collected by the data transmission terminal.

2. The data reception terminal of claim 1, wherein the noise analysis result includes information which is related to at least one of a frequency band of the noise, a generation period of the noise, and a generation time of the noise.

3. The data reception terminal of claim 1, wherein the transmission parameter includes at least one of the audible frequency band which is to be used for the transmission of data, and a data transmission period.

4. The data reception terminal of claim 1, wherein the data reception terminal acquires the transmission parameter.

5. The data reception terminal of claim 4, wherein the data reception terminal receives the data during a transmission phase of the data transmission terminal, and acquires the transmission parameter during a resting phase of the data transmission terminal, wherein the transmission phase and the resting phase are repeated periodically.

6. The data reception terminal of claim 4, wherein when the transmission parameter is transmitted by the data transmission terminal through each of a plurality of predetermined temporary audible frequency bands, the data reception terminal acquires the transmission parameter through one temporary audible frequency band of the temporary audible frequency bands.

7. A data reception method comprising:
   receiving data transmitted from a data transmission terminal based on a transmission parameter through an audible frequency band; and
   acquiring the data based on the transmission parameter,
   wherein the transmission parameter is determined based on a noise analysis result for a noise collected by the data transmission terminal.

8. The data reception method of claim 7, wherein the noise analysis result includes information which is related to at least one of a frequency band of the noise, a generation period of the noise, and a generation time of the noise.

9. The data reception method of claim 7, wherein the transmission parameter includes at least one of the audible frequency band which is to be used for the transmission of data, and a data transmission period.

10. The data reception method of claim 7, the method further comprising: acquiring the transmission parameter.

11. The data reception method of claim 10, the receiving comprises receiving the data during a transmission phase of the data transmission terminal,
    the acquiring comprises acquiring the transmission parameter during a resting phase of the data transmission terminal,
    wherein the transmission phase and the resting phase are repeated periodically.

12. The data reception method of claim 10, wherein when the transmission parameter is transmitted by the data transmission terminal through each of a plurality of predetermined temporary audible frequency bands, the acquiring comprises acquiring the transmission parameter through one temporary audible frequency band of the temporary audible frequency bands.

* * * * *